United States Patent
Takemoto et al.

(10) Patent No.: US 12,074,491 B2
(45) Date of Patent: Aug. 27, 2024

(54) MOTOR WITH A SHAFT FIXING PORTION

(71) Applicant: NIDEC CORPORATION, Kyoto (JP)

(72) Inventors: Mitsuhiro Takemoto, Kyoto (JP); Shinji Takemoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 260 days.

(21) Appl. No.: 17/839,487

(22) Filed: Jun. 14, 2022

(65) Prior Publication Data

US 2022/0399773 A1 Dec. 15, 2022

(30) Foreign Application Priority Data

Jun. 15, 2021 (JP) .................. 2021-099270

(51) Int. Cl.
| | |
|---|---|
| *H02K 3/50* | (2006.01) |
| *H02K 5/173* | (2006.01) |
| *H02K 7/08* | (2006.01) |
| *H02K 21/22* | (2006.01) |

(52) U.S. Cl.
CPC ............ *H02K 3/50* (2013.01); *H02K 5/1735* (2013.01); *H02K 7/085* (2013.01); *H02K 21/22* (2013.01); *H02K 2203/06* (2013.01)

(58) Field of Classification Search
CPC ........ H02K 3/50; H02K 5/1735; H02K 7/085; H02K 21/22; H02K 2203/06; H02K 2213/03; H02K 11/33; H02K 1/2786
USPC .......................................................... 310/71
See application file for complete search history.

(56) References Cited

U.S. PATENT DOCUMENTS

| | | | | |
|---|---|---|---|---|
| 4,458,228 A | * | 7/1984 | Baumgartner | .......... H01F 7/145 335/229 |
| 4,574,210 A | * | 3/1986 | Wieland | .................... H02K 9/06 310/67 R |
| 2015/0069861 A1 | * | 3/2015 | Buttner | .................... H02K 9/14 310/43 |
| 2022/0286012 A1 | * | 9/2022 | Nakata | .................... H02K 11/40 |
| 2022/0399773 A1 | * | 12/2022 | Takemoto | .............. H02K 7/085 |
| 2023/0137134 A1 | * | 5/2023 | Nakata | ................. H02K 5/1735 310/90 |

FOREIGN PATENT DOCUMENTS

| | | | |
|---|---|---|---|
| JP | H66693 Y2 | | 2/1994 |
| JP | 2020143689 | * | 9/2020 |

* cited by examiner

*Primary Examiner* — Ahmed Elnakib
(74) *Attorney, Agent, or Firm* — HAUPTMAN HAM, LLP

(57) ABSTRACT

A motor includes: a rotor including a shaft rotatable about an axis extending in a vertical direction; a bearing rotatably supporting the shaft; a stationary portion including a stator; and a lead wire electrically connected to the stator. The stationary portion includes a housing located radially outward of the bearing and radially inward of the stator, and supporting the bearing and the stator, a base portion which is located axially below the stator and to which the housing is fixed, and a fixing member fixed to the base portion. The fixing member includes a cover portion covering a shaft lower end portion located at an axially lower end of the shaft when viewed from axially below. The cover portion has an opening portion that opens in an axial direction. The opening portion is located radially more inside than an inner peripheral surface of the shaft when viewed from axially below.

12 Claims, 7 Drawing Sheets

MOTOR WITH A SHAFT FIXING PORTION

CROSS-REFERENCE TO RELATED APPLICATIONS

The present invention claims priority under 35 U.S.C. § 119 to Japanese Patent Application No. 2021-099270 filed on Jun. 15, 2021, the entire content of which is incorporated herein by reference.

FIELD OF THE INVENTION

The present disclosure relates to a motor.

BACKGROUND

In a conventional motor, a lead wire is drawn out from a stator which is a stationary part.

When the lead wire electrically connected to the stator comes into contact with a rotating shaft, the lead wire may be damaged.

SUMMARY

In an exemplary embodiment of the present disclosure, a motor includes: a rotor including a shaft having a tubular shape that rotates about a central axis extending in a vertical direction; a bearing located radially outward of the shaft and rotatably supporting the shaft; a stationary portion including a stator located radially outward of the bearing; and a lead wire electrically connected to the stator. The stationary portion includes a housing that is located radially outward of the bearing and radially inward of the stator, supports the bearing, and supports the stator, a base portion that is located axially below the stator and to which the housing is fixed, and a fixing member fixed to the base portion. The fixing member includes a cover portion located to cover a shaft lower end portion located at an axially lower end of the shaft when viewed from axially below. The cover portion has an opening portion that opens in an axial direction, and the opening portion is located radially more inside than an inner peripheral surface of the shaft when viewed from axially below.

The above and other elements, features, steps, characteristics and advantages of the present disclosure will become more apparent from the following detailed description of the preferred embodiments with reference to the attached drawings.

DETAILED DESCRIPTION

Figure 1:
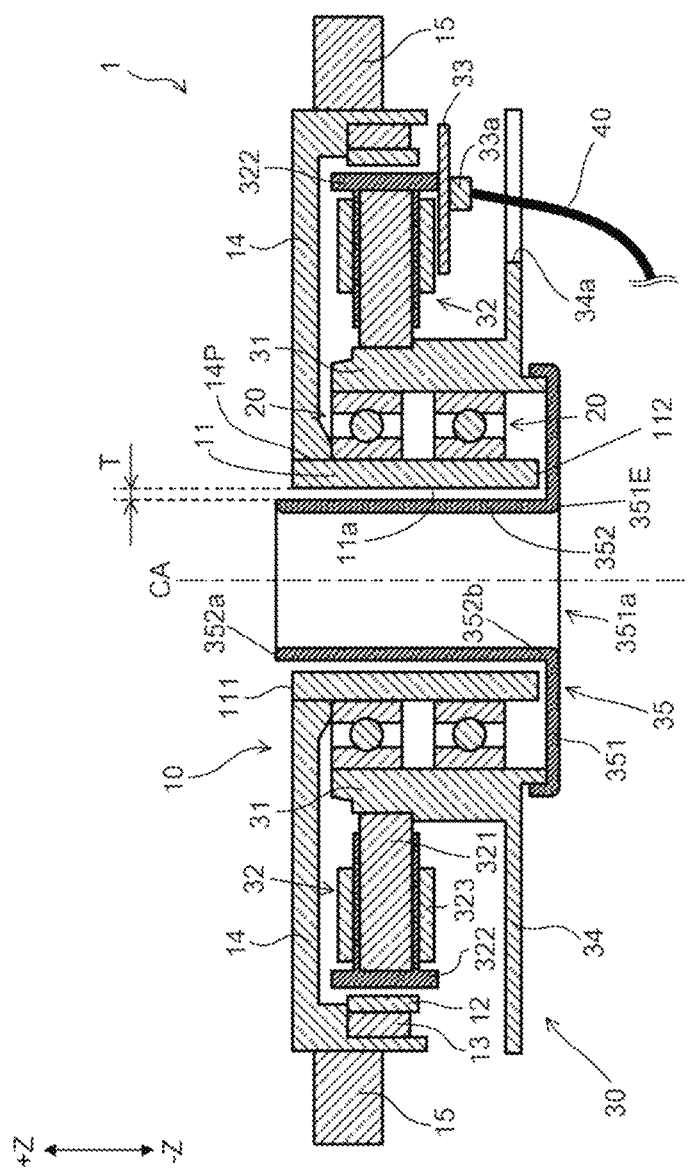
FIG. 1 is a cross-sectional view illustrating a schematic configuration of a motor according to an exemplary embodiment of the present invention.

Hereinafter, an exemplary embodiment of the present disclosure will be described in detail with reference to the drawings. Hereinafter, for convenience of description, an axis serving as a rotation center of a shaft of a motor is referred to as a "central axis". A direction in which the central axis extends is referred to as an "axial direction", "axial", or "axially". In the present description, a shape and a positional relationship of each part will be described with the axial direction as the vertical direction. However, the definition of the vertical direction does not limit the orientation and positional relationship when the motor is used.

In the present description, a first axial direction is referred to as "upper", and a second axial direction is referred to as "lower". Therefore, "upper direction" or "upward" means the axially upper direction, and "lower direction" or "downward" means axially lower direction. In the drawings, the axially upper direction is indicated by the sign +Z, and the axially lower direction is indicated by the sign −Z as appropriate. In the axial direction, an end portion in the upper direction of a member is referred to as an "axially upper end" or simply as an "upper end", and an end portion in the lower direction of a member is referred to as an "axially lower end" or simply as a "lower end". Furthermore, in a member, a surface facing the upper direction is referred to as an "upper surface", and a surface facing the lower direction is referred to as a "lower surface".

In the present description, a direction orthogonal to the central axis with the central axis as a starting point is referred to as the "radial direction", "radial", or "radially". In the radial direction, a direction approaching the central axis is referred to as "radially inward", and a direction away from the central axis is referred to as "radially outward". Further, a direction along a circular arc around the central axis is referred to as a "circumferential direction", "circumferential", or "circumferentially".

Figure 2:
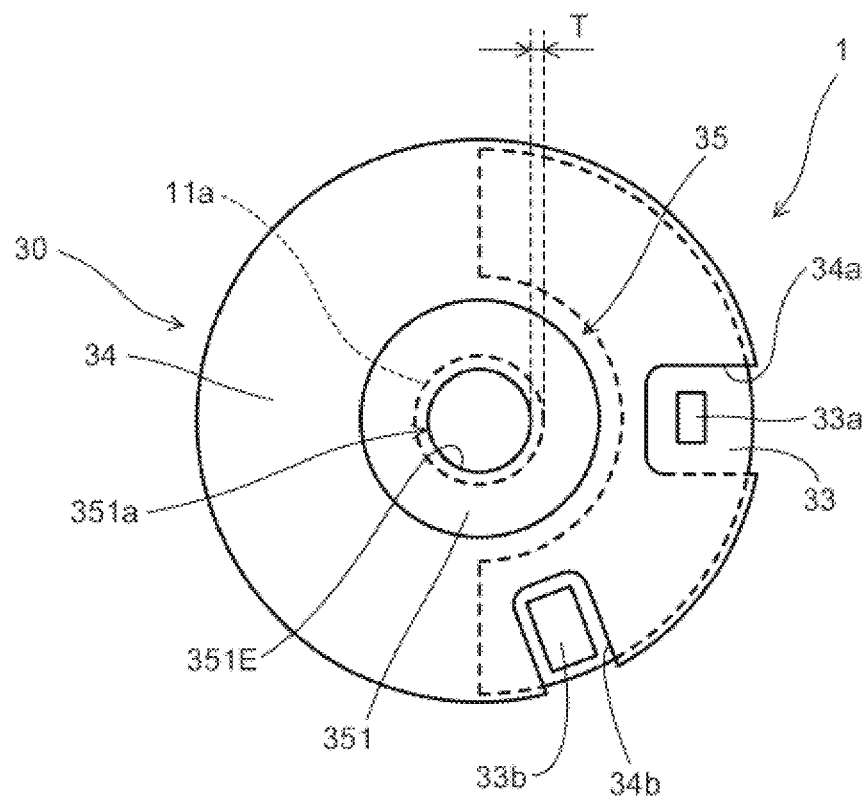
FIG. 2 is a bottom view of the motor.

FIG. 1 is a cross-sectional view illustrating a schematic configuration of a motor 1 according to an exemplary embodiment of the present invention. FIG. 2 is a bottom view of the motor 1. The motor 1 is an outer rotor type motor. The motor 1 includes a rotor 10, a bearing 20, a stationary portion 30, and a lead wire 40.

The rotor 10 is also referred to as a rotator. The rotor 10 includes a shaft 11, a magnet 12, a rotor yoke 13, a lid portion 14, and a flange portion 15.

The shaft 11 rotates about a central axis CA extending in the vertical direction. The shaft 11 is formed of a tubular member made from metal such as stainless steel. That is, the motor 1 includes the rotor 10 including the shaft 11 having a tubular shape that rotates about the central axis CA extending in the vertical direction.

The shaft 11 having a tubular shape is also referred to as a hollow shaft. The shaft 11 has an inner peripheral surface 11a. The inner peripheral surface 11a is a surface located farthest on the radially inner side of the shaft 11 and surrounds the central axis CA in the circumferential direction.

The shaft 11 has a shaft upper end portion 111 and a shaft lower end portion 112. The shaft upper end portion 111 is located at the upper end of the shaft 11. That is, the shaft 11 has the shaft upper end portion 111 at the axially upper end.

The shaft lower end portion 112 is located at the lower end of the shaft 11. That is, the shaft 11 has the shaft lower end portion 112 at the axially lower end.

The magnet 12 is located radially outward of a stator 32 described later and surrounds the central axis CA in the circumferential direction. The magnet 12 may be configured in a single ring shape. A plurality of the magnets 12 may be arranged in the circumferential direction.

The rotor yoke 13 is located radially outward of the magnet 12 and supports the magnet 12. The rotor yoke 13 is formed in a shape surrounding the central axis CA in the circumferential direction. The magnet 12 and the rotor yoke 13 are supported by the lid portion 14.

The lid portion 14 is made from, for example, metal. The lid portion 14 may be made from resin. The lid portion 14 covers a housing 31 described later and the stator 32 of the stationary portion 30 from the upper direction.

Figure 4:
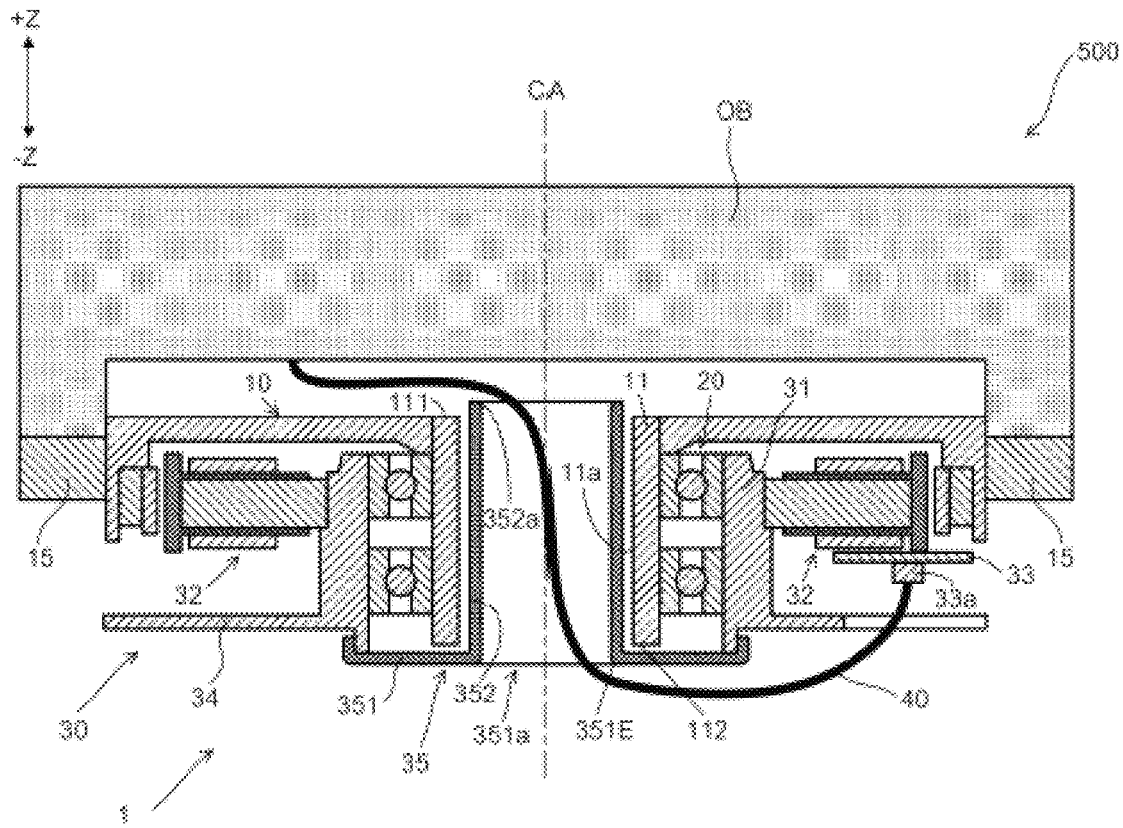
FIG. 4 is a cross-sectional view illustrating a schematic configuration of an electric device including a motor.

The flange portion 15 is located radially outward of the lid portion 14 and is fixed to the lid portion 14. The flange portion 15 is made from metal, for example. The flange portion 15 may be made from resin. For example, an object OB to be rotated illustrated in FIG. 4 is attached to the flange portion 15. Note that details of the object OB to be rotated will be described later.

The lid portion 14 has a through hole 14P penetrating in the axial direction. The shaft 11 is press-fitted into the through hole 14P of the lid portion 14. In this manner, the shaft 11, the magnet 12, the rotor yoke 13, the lid portion 14, and the flange portion 15 can be integrally rotated about the central axis CA.

The bearing 20 is located radially outward of the shaft 11. The bearing 20 rotatably supports the shaft 11 around the central axis CA. That is, the motor 1 includes the bearing 20 that is located radially outward of the shaft 11 and rotatably supports the shaft 11.

The bearing 20 is, for example, a ball bearing. The bearing 20 may be a sleeve bearing. In the present embodiment, two of the bearings 20 are arranged apart from each other in the axial direction, but the number of the bearings 20 is not particularly limited.

The stationary portion 30 includes the housing 31, the stator 32, a circuit board 33, a base portion 34, and the fixing member 35.

The housing 31 is formed in a tubular shape surrounding the central axis CA in the circumferential direction. The housing 31 is made from metal, for example, but may be made from resin. The housing 31 is located radially outward of the bearing 20 and radially inward of the stator 32. The housing 31 supports the bearing 20 on the radially inner side and supports the stator 32 on the radially outer side. That is, the stationary portion 30 is located radially outward of the bearing 20 and radially inward of the stator 32, and includes the housing 31 that supports the bearing 20 and also supports the stator 32.

The stator 32 is located radially outward of the bearing 20 and radially inward of the magnet 12 of the rotor 10. That is, the stationary portion 30 includes the stator 32 located radially outward of the bearing 20. The stator 32 includes a stator core 321, an insulator 322, and a coil 323.

The stator core 321 is configured by laminating electromagnetic steel plates such as silicon steel plates on top of one another, for example. The insulator 322 is formed of resin having insulating properties. The insulator 322 is provided surrounding an outer surface of the stator core 321. The coil 323 is formed of a conductive wire wound around the stator core 321 with the insulator 322 interposed between them. The coil 323 is electrically connected to the circuit board 33. In this manner, drive current is supplied from the circuit board 33 to the coil 323.

The circuit board 33 is attached to the insulator 322. The circuit board 33 is provided with a DC jack (not illustrated). A cable (not illustrated) is connected to the DC jack. In this manner, DC power is supplied to the circuit board 33 via the cable.

As illustrated in FIG. 2, a connector 33a and an electronic component 33b are provided on a lower surface of the circuit board 33. The lead wire 40 illustrated in FIG. 1 is electrically connected to the circuit board 33 via the connector 33a. As described above, the circuit board 33 is electrically connected to the coil 323 of the stator 32. Therefore, the lead wire 40 is electrically connected to the stator 32 via the circuit board 33. That is, the motor 1 includes the lead wire 40 electrically connected to the stator 32. The lead wire 40 is formed by bundling a plurality of cables.

The electronic component 33b includes, for example, a temperature sensor such as a thermistor. Although not illustrated, the circuit board 33 also includes other electronic components such as a Hall element and a photosensor.

The base portion 34 is located in the lower direction of the stator 32. The base portion 34 is formed in an annular shape in the circumferential direction. The housing 31 is fixed to an upper surface of the base portion 34. That is, the stationary portion 30 is located in the axially lower direction of the stator 32 and has the base portion 34 to which the housing 31 is fixed.

In the present embodiment, the base portion 34 is made from metal, for example, and is formed integrally with the housing 31. For example, the housing 31 may be made from resin, and the base portion 34 may be made from metal. In this case, the housing 31 and the base portion 34 are connected by, for example, a method such as adhesion or press-fitting with an adhesive.

As illustrated in FIG. 2, the base portion 34 includes a lead wire insertion portion 34a and an electronic component exposing portion 34b. The lead wire insertion portion 34a and the electronic component exposing portion 34b are displaced in the circumferential direction in the base portion 34. The lead wire insertion portion 34a is formed of a notch recessed radially inward from the radially outer side of the base portion 34. The lead wire insertion portion 34a may be a hole penetrating the base portion 34 in the axial direction. The lead wire 40 connected to the connector 33a of the circuit board 33 is drawn downward through the lead wire insertion portion 34a. This prevents interference between the lead wire 40 and the base portion 34.

The lead wire 40 drawn downward from the circuit board 33 through the lead wire insertion portion 34a is electrically connected to the object OB to be rotated that swings and moves as illustrated in FIG. 4.

Similarly to the lead wire insertion portion 34a, the electronic component exposing portion 34b is also formed of a notch recessed radially inward from the radially outer side of the base portion 34. Note that the electronic component exposing portion 34b may be a hole penetrating the base portion 34 in the axial direction. The electronic component 33b provided on the lower surface of the circuit board 33 is exposed downward via the electronic component exposing portion 34b. In this manner, even when the electronic component 33b is high in the axial direction, the electronic component 33b can be held on the circuit board 33 while interference with the base portion 34 is prevented.

In the above configuration, when drive current is supplied to the coil 323, a magnetic flux in the radial direction is generated in the stator core 321. A magnetic field generated by the magnetic flux of the stator core 321 and a magnetic field generated by the magnet 12 act to generate torque in the circumferential direction of the rotor 10. This torque causes the rotor 10 including the shaft 11 to rotate about the central axis CA.

Figure 3:
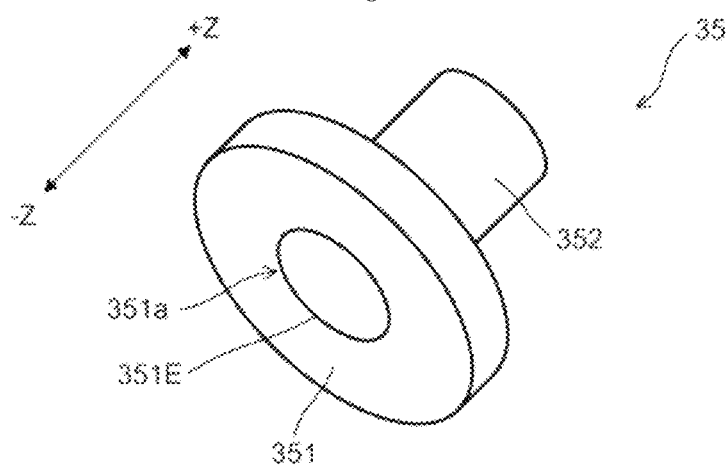
FIG. 3 is a perspective view illustrating an appearance of a fixing member included in the motor.

Next, the fixing member 35 of the stationary portion 30 will be described with reference to FIGS. 1 to 3. FIG. 3 is a perspective view illustrating an external appearance of the fixing member 35. The fixing member 35 is fixed to the base portion 34 of the stationary portion 30 from the lower direction. That is, the stationary portion 30 includes the fixing member 35 fixed to the base portion 34. The fixing member 35 is fixed to the base portion 34 by, for example, press-fitting, but may be fixed by other methods such as adhesion and screwing. The fixing member 35 is made from, for example, resin, but may be made from metal.

The fixing member 35 includes a cover portion 351. The cover portion 351 is located to cover the shaft lower end portion 112 of the shaft 11 when viewed from below. That is, the fixing member 35 has the cover portion 351 located to cover the shaft lower end portion 112 located at the axially lower end of the shaft 11 when viewed from axially below.

The cover portion 351 has an opening portion 351*a*. The opening portion 351*a* is provided to open in the direction of the central axis CA on the cover portion 351. That is, the cover portion 351 has the opening portion 351*a* that opens in the axial direction. As illustrated in FIG. 2, the opening portion 351*a* of the cover portion 351 has a circular shape when the cover portion 351 is viewed from the lower direction. In other words, a shape of the edge 351E defining an outer shape of the opening portion 351*a* is circular. The shape of the opening portion 351*a* is not limited to a circular shape, and may be a polygonal shape such as a quadrangle.

The opening portion 351*a* of the cover portion 351 is located radially more inside than the inner peripheral surface 11*a* of the shaft 11 when viewed from below. That is, the opening portion 351*a* is located radially more inside than the inner peripheral surface 11*a* of the shaft 11 when viewed from axially below.

As illustrated in FIGS. 1 and 3, the fixing member 35 further includes a tubular portion 352. The tubular portion 352 has a tubular portion upper end portion 352*a* and a tubular portion lower end portion 352*b*. The tubular portion upper end portion 352*a* is located at the upper end of the tubular portion 352. That is, the tubular portion 352 has the tubular portion upper end portion 352*a* at the axially upper end. The tubular portion lower end portion 352*b* is located at the lower end of the tubular portion 352. That is, the tubular portion 352 has the tubular portion lower end portion 352*b* at the axially lower end.

The tubular portion 352 is located in the upper direction of the cover portion 351. The tubular portion lower end portion 352*b* is fixed to the cover portion 351. The inside of the tubular portion 352 is connected to the opening portion 351*a* of the cover portion 351. That is, the fixing member 35 includes the tubular portion 352 that is fixed to the cover portion 351 and has the inside connected to the opening portion 351*a*. Note that the cover portion 351 and the tubular portion 352 may be integrally formed.

The tubular portion 352 extends in the upper direction inside the shaft 11 from a radially inner end portion of the cover portion 351. That is, the tubular portion 352 extends in the axially upper direction inside the shaft 11 from the cover portion 351. In the motor 1 illustrated in FIG. 1, the tubular portion upper end portion 352*a* is located above the shaft upper end portion 111. That is, the upper end of the tubular portion 352 is located axially above the upper end of the shaft 11.

As illustrated in FIGS. 1 and 2, in the shaft 11, the tubular portion 352 is located radially inward from the inner peripheral surface 11*a* of the shaft 11 by a gap T. That is, the tubular portion 352 is located inside the shaft 11 with the gap T interposed between the tubular portion 352 and the inner peripheral surface 11*a* of the shaft 11.

FIG. 4 is a cross-sectional view illustrating a schematic configuration of an electric device 500 including the motor 1 having the above configuration. The electric device 500 includes the object OB to be rotated in addition to the motor 1. The object OB to be rotated is an object to be rotated by the motor 1. Examples of the object OB to be rotated include a speaker, a circulator, a tablet, a television, a mirror, and the like. Note that the object OB to be rotated is not limited to these examples.

The object OB to be rotated is attached to the flange portion 15 of the rotor 10 included in the motor 1. Various methods such as adhesion and screwing can be employed for attaching the object OB to be rotated to the flange portion 15.

The above-described lead wire 40 is electrically connected to the object OB to be rotated attached to the rotor 10. That is, a first end of the lead wire 40 is electrically connected to the circuit board 33, and a second end is electrically connected to the object OB to be rotated. In this manner, various types of information can be output from the circuit board 33 to the object OB to be rotated via the lead wire 40. Examples of the information include rotational position information of the rotor 10 detected by a Hall element and a photosensor of the circuit board 33, and temperature information detected by a thermistor. Further, power can also be supplied from the circuit board 33 to the object OB to be rotated via the lead wire 40.

The lead wire 40 is located through the inside of the shaft 11 having a tubular shape. In this manner, as illustrated in FIG. 4, even in a configuration in which the circuit board 33 and the object OB to be rotated are located on opposite sides to each other with respect to the stator 32 in the axial direction, the circuit board 33 and the object OB to be rotated can be electrically connected by the lead wire 40 without having the lead wire 40 exposed to the radial outside of the motor 1. Therefore, it is possible to reduce a situation in which appearance quality is impaired due to the lead wire 40 being exposed to the radial outside of the motor 1.

When the rotor 10 rotates about the central axis CA, the object OB to be rotated fixed to the rotor 10 also rotates about the central axis CA. Here, a reference position when the rotor 10 rotates in the circumferential direction is a position at a rotation angle of zero degrees. A maximum angle to which the rotor 10 can rotate in one circumferential direction from the reference position is set to $+A°$. A maximum angle to which the rotor 10 can rotate in the opposite circumferential direction from the reference position is set to $-A°$. A value of A is an angle of less than $180°$ in absolute value, but can be set as appropriate.

The rotor 10 is rotated from the reference position to a position of $+A°$ in one circumferential direction, and then the rotor 10 is rotated to a position of $-A°$ in the opposite circumferential direction. By repeatedly switching the rotation direction, the object OB to be rotated fixed to the rotor 10 can be caused to swing and move at an angle of $\pm A°$ in the circumferential direction. A rotational speed of the rotor 10 in the circumferential direction can be appropriately set by adjusting the magnitude of drive current flowing to the coil 323.

In the present embodiment, the stationary portion 30 of the motor 1 includes the fixing member 35 described above. In this manner, as illustrated in FIG. 4, it is possible to employ a layout in which the lead wire 40 passes through the opening portion 351a of the cover portion 351 of the fixing member 35 and the inside of the shaft 11 having a tubular shape.

At this time, the cover portion 351 is fixed to the base portion 34 of the stationary portion 30. For this reason, the fixing member 35 is in a stationary state. Further, the lead wire 40 is electrically connected to the stator 32 of the stationary portion 30, that is, the stator 32 in a stationary state. For this reason, even if the lead wire 40 comes into contact with the edge 351E of the opening portion 351a of the cover portion 351 when passing through the inside of the shaft 11 having a tubular shape, the lead wire 40 can be prevented from being rubbed against the edge 351E.

The opening portion 351a of the cover portion 351 is located radially more inside than the inner peripheral surface 11a of the shaft 11. Therefore, as illustrated in FIG. 4, when the lead wire 40 passes through the inside of shaft 11 from below to above, the edge 351E of the opening portion 351a of the cover portion 351 is located between the shaft lower end portion 112 and the lead wire 40. For this reason, even when the shaft 11 is rotated by rotation of the rotor 10, direct contact of the lead wire 40 with the shaft lower end portion 112 is suppressed.

As described above, even when the layout in which the lead wire 40 passes through the opening portion 351a of the cover portion 351 and the inside of the shaft 11 is employed, (1) the lead wire 40 can be prevented from rubbing against the edge 351E of the opening portion 351a. Further, (2) even when the shaft 11 rotates, direct contact of the lead wire 40 with the shaft lower end portion 112 is suppressed. For these two reasons, it is possible to reduce the possibility that lead wire 40 is damaged.

The tubular portion 352 of the fixing member 35 extends in the upper direction inside the shaft 11 from the cover portion 351. In this configuration, when the lead wire 40 passes through the inside of the shaft 11, the tubular portion 352 is located between the inner peripheral surface 11a of the shaft 11 and the lead wire 40. In this manner, even when the shaft 11 rotates, direct contact of the lead wire 40 with the inner peripheral surface 11a of the shaft 11 is suppressed. As a result, it is possible to reduce the possibility that the lead wire 40 is damaged by coming into contact with the inner peripheral surface 11a of the rotating shaft 11.

In the radial direction, the gap T exists between the tubular portion 352 and the inner peripheral surface 11a of the shaft 11. In this manner, even when the shaft 11 rotates, the tubular portion 352 is not in contact with the shaft 11. Therefore, it is possible to reduce the possibility that the tubular portion 352 comes into contact with the rotating shaft 11 and is damaged.

The upper end of the tubular portion 352 is located above the upper end of the shaft 11. In this configuration, as illustrated in FIG. 4, when a layout in which the lead wire 40 passes through the inside of the shaft 11 from below to above, exits the shaft upper end portion 111, and is bent radially outward is employed, the tubular portion upper end portion 352a is located between the shaft upper end portion 111 and the lead wire 40. For this reason, when the shaft 11 rotates, the lead wire 40 is prevented from directly contacting the shaft upper end portion 111. Therefore, it is possible to reduce the possibility that the lead wire 40 is damaged by coming into contact with the rotating shaft upper end portion 111.

Figure 5:
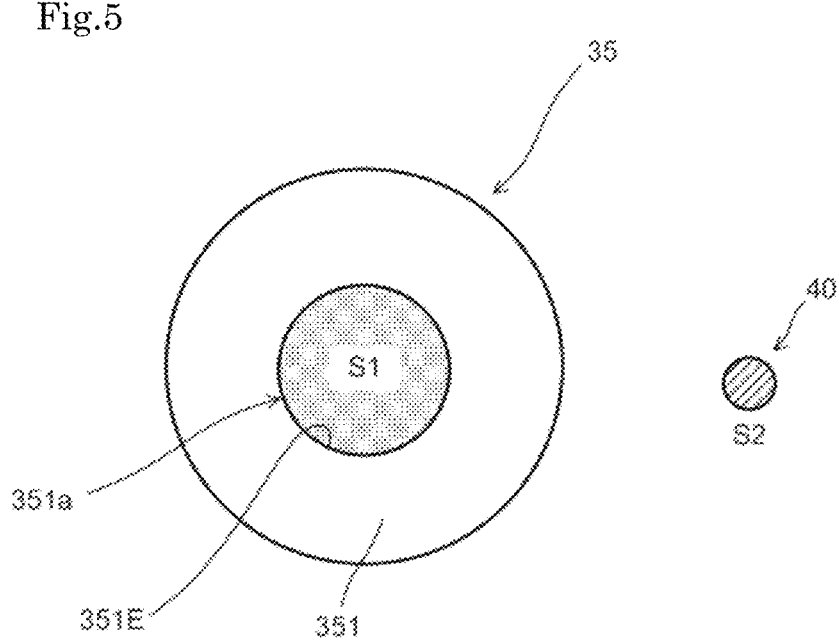
FIG. 5 is a bottom view of the fixing member.

FIG. 5 is a bottom view of the fixing member 35. An area of the opening portion 351a when the cover portion 351 is viewed from below is defined as S1 (mm$^2$). A cross-sectional area of the lead wire 40 is defined as S2 (mm$^2$). In the present embodiment, S1>S2. That is, the area of opening portion 351a of cover portion 351 is larger than the cross-sectional area of lead wire 40.

Due to such a relationship between S1 and S2, the lead wire 40 can pass through the opening portion 351a. That is, as illustrated in FIG. 4, a layout of the motor 1 in which the lead wire 40 passes through the opening portion 351a of the cover portion 351 can be realized.

In the configuration of FIG. 4, a part of lead wire 40 is located inside the opening portion 351a of cover portion 351 and the shaft 11.

In the configuration in which the lead wire 40 is located inside the opening portion 351a of the cover portion 351 and the shaft 11, the edge 351E of the opening portion 351a of cover portion 351 is located at least between the shaft lower end portion 112 and the lead wire 40. This prevents the lead wire 40 from directly contacting at least the shaft lower end portion 112. Therefore, even when the shaft 11 rotates, it is possible to reduce the possibility that the lead wire 40 is damaged.

In particular, in the configuration in which a part of the lead wire 40 is located inside the opening portion 351a and the tubular portion 352, the tubular portion 352 exists between the inner peripheral surface 11a of the shaft 11 and the lead wire 40. The presence of the tubular portion 352 suppresses direct contact of the lead wire 40 with the inner peripheral surface 11a of the shaft 11. Therefore, even when the shaft 11 rotates, it is possible to reduce the possibility that the lead wire 40 is damaged by coming into contact with the inner peripheral surface 11a of the shaft 11.

As illustrated in FIG. 4, the electric device 500 according to the present embodiment includes the motor 1 described above, and the object OB to be rotated fixed to the rotor 10 of the motor 1.

In this configuration, in the electric device 500, a layout in which the lead wire 40 is electrically connected to the object OB to be rotated through the opening portion 351a of the fixing member 35 and the inside of the shaft 11 can be realized. In such a layout of the electric device 500, the edge 351E of the opening portion 351a of the cover portion 351 is located at least between the shaft lower end portion 112 and the lead wire 40. This prevents the lead wire 40 from directly contacting at least the shaft lower end portion 112. Therefore, in the electric device 500, even when the shaft 11 of the motor 1 rotates and the object OB to be rotated rotates in the circumferential direction accordingly, it is possible to reduce the possibility that the lead wire 40 is damaged.

In the electric device 500, as illustrated in FIG. 4, the object OB to be rotated is electrically connected to the lead wire 40 disposed inside the shaft 11 of the motor 1. As described above, in the configuration of the electric device 500 in which the object OB to be rotated is electrically connected to the lead wire 40, it is possible to reduce the possibility that the lead wire 40 comes into contact with the shaft 11 that rotates and is damaged.

Figure 6:
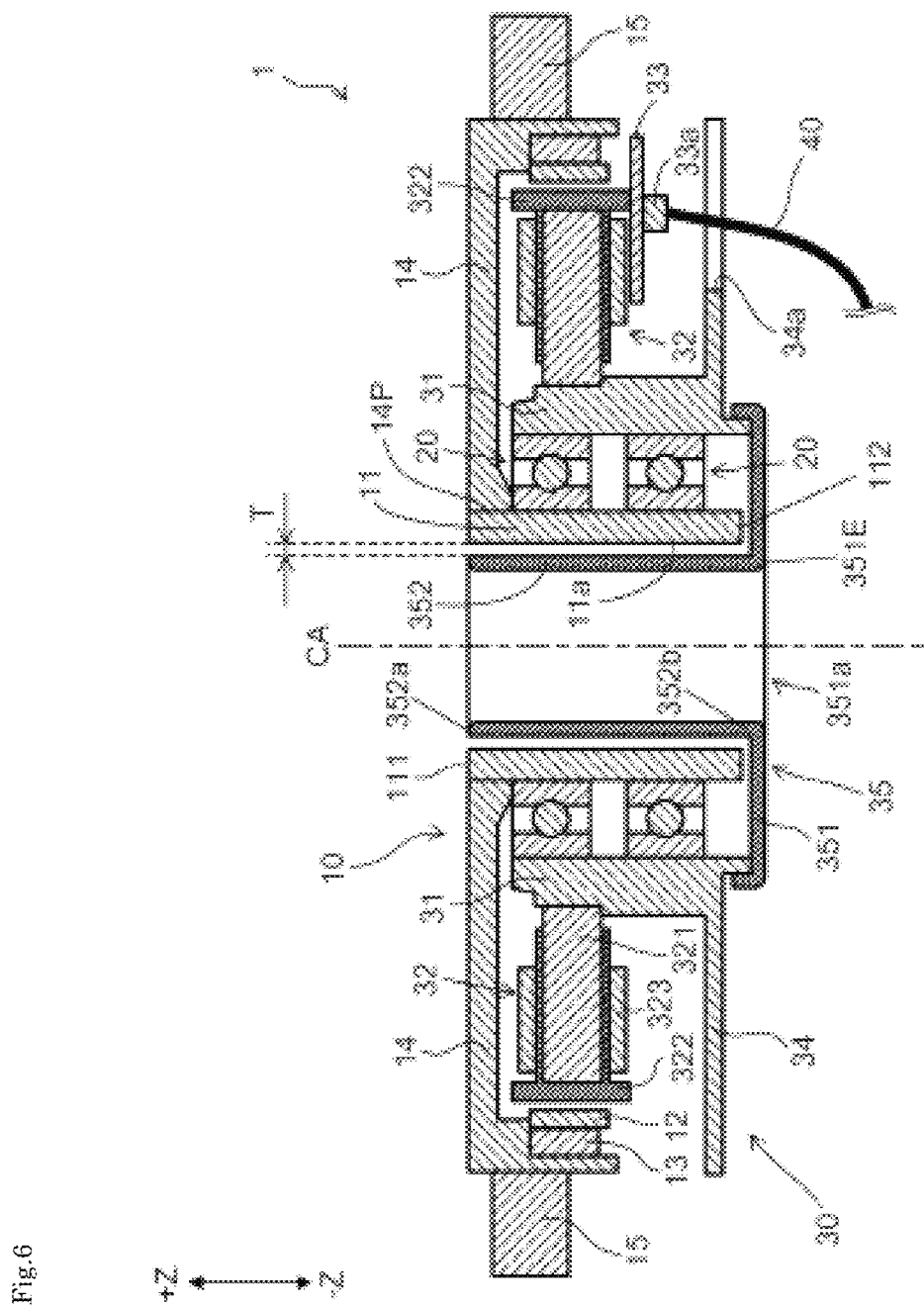
FIG. 6 is a cross-sectional view illustrating another configuration of the motor.

FIG. 6 is a cross-sectional view illustrating another configuration of the motor 1. The fixing member 35 applied to the motor 1 may have the configuration of FIG. 6. In the configuration of FIG. 6, the tubular portion upper end portion 352a of the fixing member 35 is at the same position as the shaft upper end portion 111 in the axial direction. That is, the upper end of the tubular portion 352 is at the same position as the upper end of the shaft 11 in the axial direction.

Even when the fixing member 35 has the configuration of FIG. 6, the tubular portion upper end portion 352a is located between the shaft upper end portion 111 and the lead wire 40 passing through the inside of the shaft 11, and the lead wire 40 can be prevented from directly contacting the shaft upper end portion 111. In this manner, it is possible to reduce the possibility that the lead wire 40 is damaged by coming into contact with the rotating shaft upper end portion 111.

Figure 7:
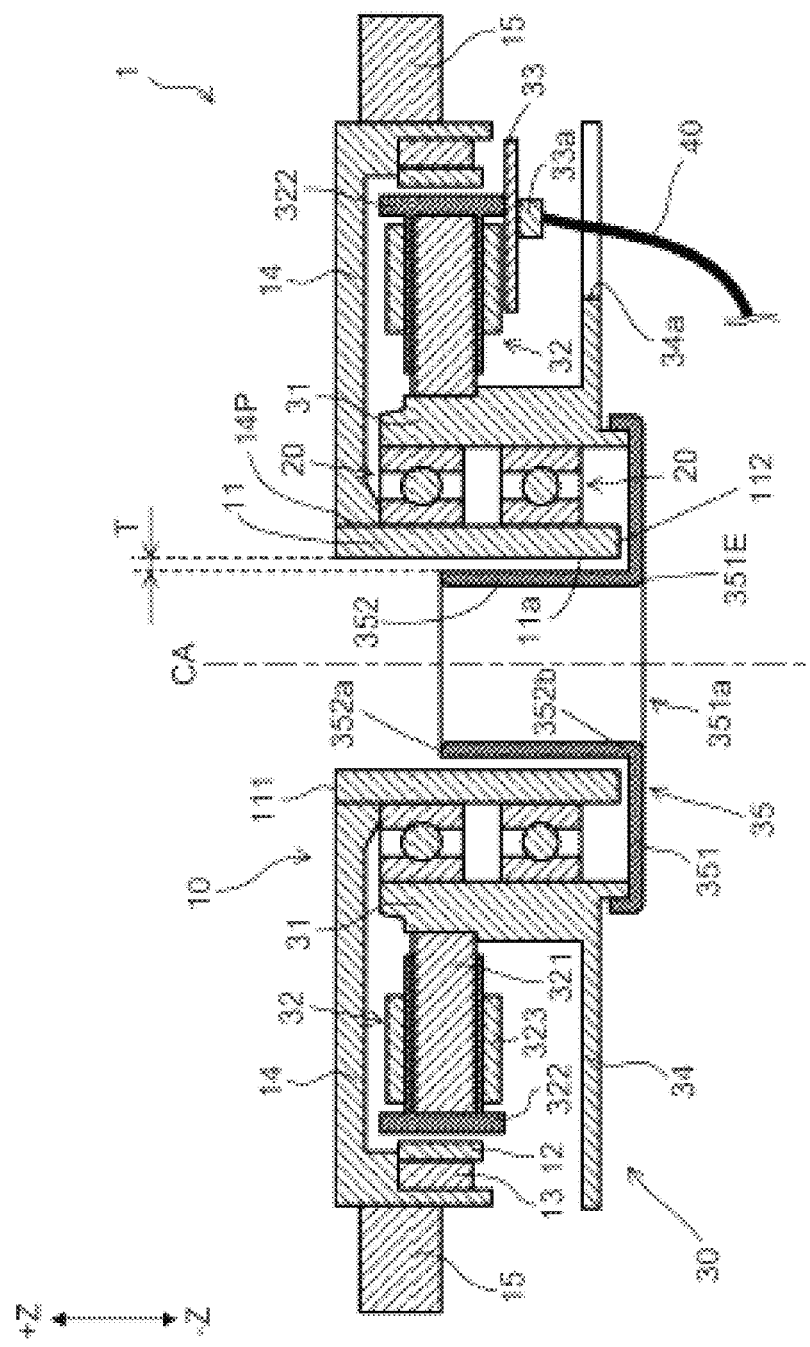
FIG. 7 is a cross-sectional view illustrating still another configuration of the motor.

FIG. 7 is a cross-sectional view illustrating still another configuration of the motor 1. The fixing member 35 applied to the motor 1 may have the configuration of FIG. 7. In the configuration of FIG. 7, the tubular portion upper end portion 352a of the fixing member 35 is located below the shaft upper end portion 111. That is, the upper end of the tubular portion 352 is located axially below the upper end of the shaft 11.

When a layout in which the lead wire 40 passes through the inside of the shaft 11 from below to above is employed, the tubular portion 352 is located between a part of the inner peripheral surface 11a of the shaft 11 and the lead wire 40. For this reason, when the shaft 11 rotates, the lead wire 40 is prevented from directly contacting the inner peripheral surface 11a of the shaft 11. In this manner, it is possible to reduce the possibility that the lead wire 40 is damaged by coming into contact with the inner peripheral surface 11a of the rotating shaft 11.

Figure 8:
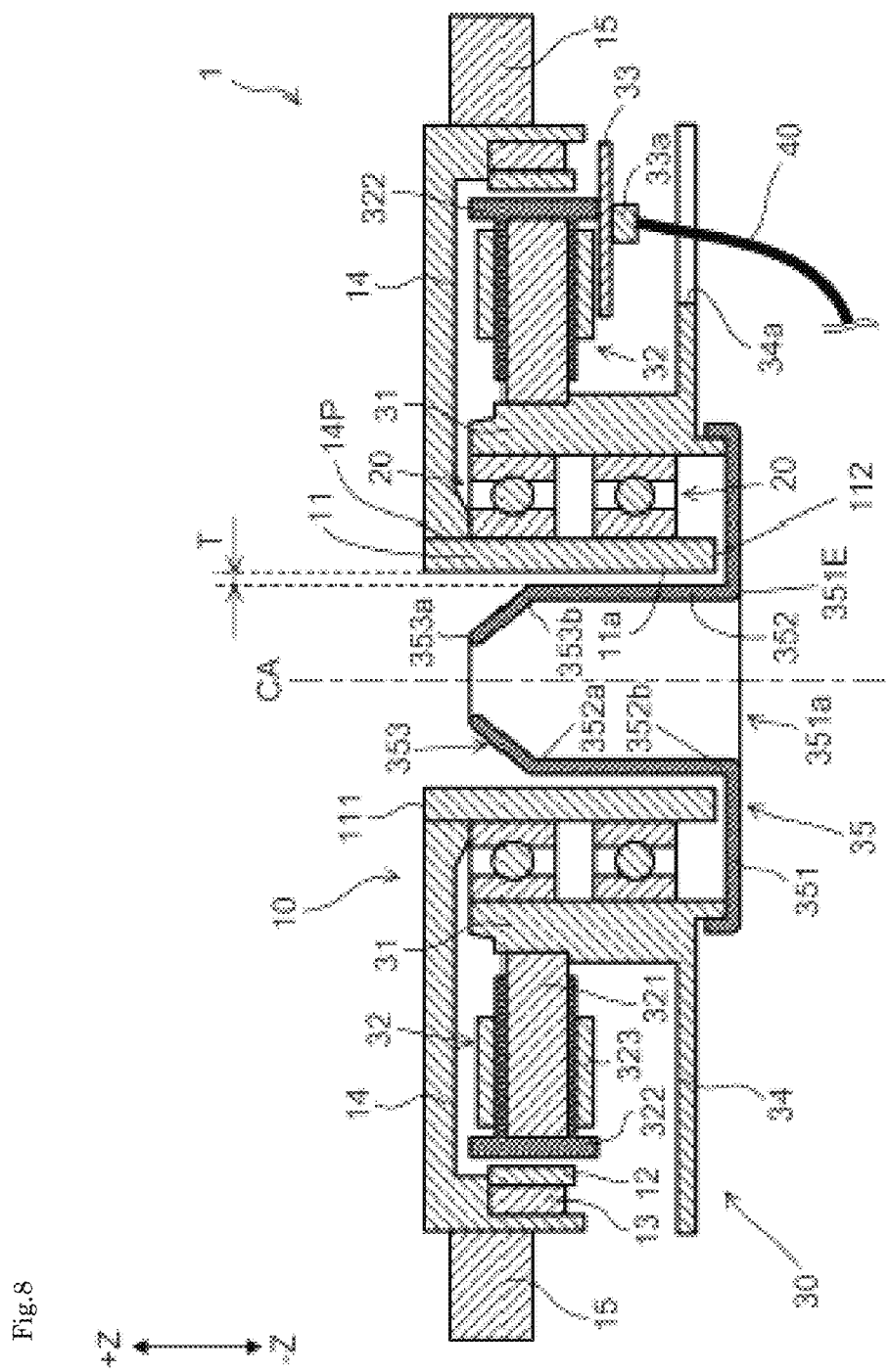
FIG. 8 is a cross-sectional view illustrating still another configuration of the motor.

FIG. 8 is a cross-sectional view illustrating still another configuration of the motor 1. The fixing member 35 applied to the motor 1 may have the configuration of FIG. 8. In the configuration of FIG. 8, the fixing member 35 has an inclined portion 353. The inclined portion 353 is fixed to the upper end of the tubular portion 352. That is, the fixing member 35 has the inclined portion 353 connected to the upper end of the tubular portion 352.

The inclined portion 353 has an inclined upper end portion 353a and an inclined lower end portion 353b. The inclined upper end portion 353a is located at the upper end of the inclined portion 353. That is, the inclined portion 353 has the inclined upper end portion 353a at the axially upper end. The inclined lower end portion 353b is located at the lower end of the inclined portion 353. That is, the inclined portion 353 has the inclined lower end portion 353b at the axially lower end. The inclined lower end portion 353b is fixed to the tubular portion upper end portion 352a. In this manner, the inclined portion 353 is connected to the upper end of the tubular portion 352. Note that the inclined portion 353 may be formed integrally with the tubular portion 352.

The inclined portion 353 is formed in a tapered shape in which an opening diameter decreases from the lower side to the upper side. That is, the inclined portion 353 is more inclined in a direction approaching the central axis CA, from the axially lower side toward the axially upper side. The inclined upper end portion 353a opens in the axial direction. That is, the upper end of the inclined portion 353 opens in the axial direction.

In the configuration of FIG. 8, when the lead wire 40 passes through an opening of the inclined upper end portion 353a from the lower side to the upper side in the tubular portion 352, the lead wire 40 is guided by the inclined portion 353 in a direction approaching the central axis CA. In this manner, a distance between the lead wire 40 that passes through the opening of the inclined upper end portion 353a and the inner peripheral surface 11a of the shaft 11 increases. As a result, the lead wire 40 is less likely to come into contact with the shaft upper end portion 111. Therefore, it is possible to reduce the possibility that the lead wire 40 comes into contact with the shaft upper end portion 111 and is damaged.

Figure 9:
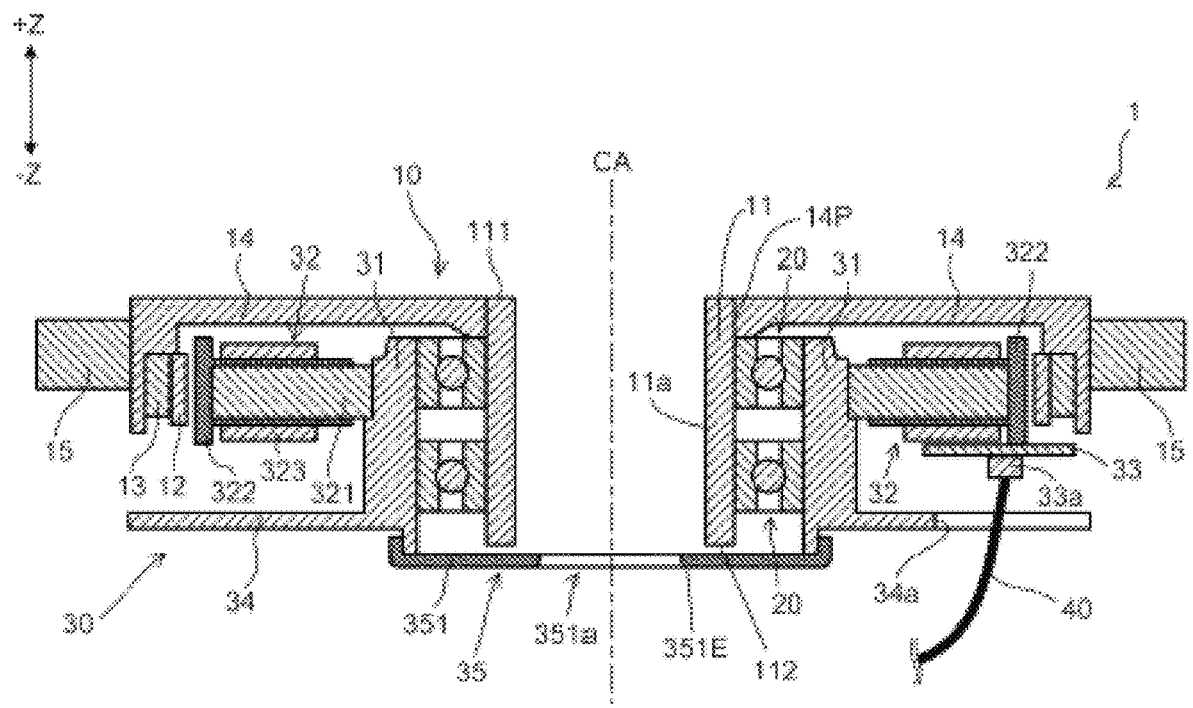
FIG. 9 is a cross-sectional view illustrating still another configuration of the motor.
Figure 10:
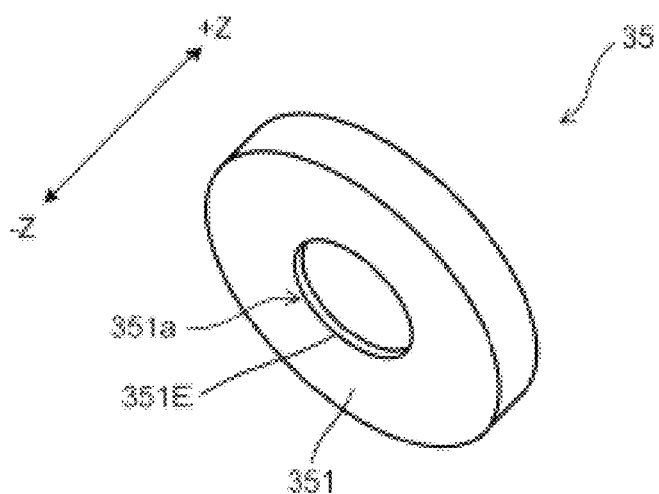
FIG. 10 is a perspective view of the fixing member included in the motor of FIG. 9.

FIG. 9 is a cross-sectional view illustrating still another configuration of the motor 1. FIG. 10 is a perspective view of the fixing member 35 of FIG. 9. The configuration may be such that the fixing member 35 applied to the motor 1 includes only the cover portion 351 described above. In this case, the fixing member 35 is located outside the shaft 11. That is, the fixing member 35 does not exist inside the shaft 11.

Even if the fixing member 35 is located outside the shaft 11, that is, even if the fixing member 35 is formed only of the cover portion 351, when the lead wire 40 passes through the inside of the shaft 11, the edge 351E of the opening portion 351a of the cover portion 351 is located between the shaft lower end portion 112 and the lead wire 40. For this reason, when the shaft 11 rotates, the lead wire 40 is prevented from directly contacting the shaft lower end portion 112. Therefore, it is possible to reduce the possibility that the lead wire 40 is damaged by coming into contact with the shaft 11 that rotates.

In the present embodiment, the configuration in which the fixing member 35, that is, a member for preventing contact between the lead wire 40 and the shaft 11 is provided in the motor 1 is described. However, the member may be provided on the object OB to be rotated. For example, the member is formed in a tubular shape and fixed to the object OB to be rotated. Then, the member is extended downward from the object OB to be rotated and located inside the shaft 11. By allowing the lead wire 40 electrically connected to the stator 32 to pass from the lower side to the inside of the member and electrically connecting the lead wire 40 to the object OB to be rotated located above the member, it is possible to reduce the possibility that the lead wire 40 and the shaft 11 come into contact with each other and to reduce the possibility that the lead wire 40 is damaged.

The motor of the present disclosure can be used for, for example, an electric device that swings an object to be rotated.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a rotor including a shaft having a tubular shape, the shaft rotating about a central axis extending in a vertical direction;
   a bearing located radially outward of the shaft and rotatably supporting the shaft;
   a stationary portion including a stator located radially outward of the bearing; and
   a lead wire electrically connected to the stator,
   wherein the stationary portion includes
   a housing that is located radially outward of the bearing and radially inward of the stator, supports the bearing, and supports the stator,
   a base portion that is located axially below the stator and to which the housing is fixed, and
   a fixing member fixed to the base portion, the fixing member includes a cover portion located to cover a shaft lower end portion located at an axially lower end of the shaft when viewed from axially below, the cover portion has an opening portion that opens in an axial direction, and the opening portion is located radially more inside than an inner peripheral surface of the shaft when viewed from axially below.

2. The motor according to claim 1, wherein an area of the opening portion of the cover portion is larger than a cross-sectional area of the lead wire.

3. The motor according to claim 1, wherein the fixing member further includes a tubular portion fixed to the cover portion and having an inside connected to the opening portion, and the tubular portion extends axially upward inside the shaft from the cover portion.

4. The motor according to claim 3, wherein the tubular portion is located inside the shaft with a gap interposed between the tubular portion and the inner peripheral surface of the shaft.

5. The motor according to claim 3, wherein an upper end of the tubular portion is located axially above an upper end of the shaft.

6. The motor according to claim 3, wherein an upper end of the tubular portion is at a same position as an upper end of the shaft in the axial direction.

7. The motor according to claim 3, wherein an upper end of the tubular portion is located axially below an upper end of the shaft.

8. The motor according to claim 7, wherein the fixing member includes an inclined portion connected to an upper end of the tubular portion, the inclined portion is more inclined in a direction approaching the central axis, from an axially lower side toward an axially upper side, and an upper end of the inclined portion opens in the axial direction.

9. The motor according to claim 1, wherein the fixing member is located outside the shaft.

10. The motor according to claim 1, wherein a part of the lead wire is located inside the opening portion of the cover portion and the shaft.

11. An electric device comprising:

the motor according to claim 1; and an object to be rotated that is fixed to the rotor of the motor.

12. The electric device according to claim 11, wherein the object to be rotated is electrically connected to the lead wire disposed inside the shaft of the motor.

* * * * *